(12) United States Patent
Haussmann et al.

(10) Patent No.: US 6,374,801 B1
(45) Date of Patent: Apr. 23, 2002

(54) IGNITION CONTROL DEVICE AND METHOD

(75) Inventors: Martin Haussmann, Sachsenheim; Harry Friedmann, Renningen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/700,931

(22) PCT Filed: Oct. 28, 1999

(86) PCT No.: PCT/DE99/03459

§ 371 Date: Jan. 31, 2001

§ 102(e) Date: Jan. 31, 2001

(87) PCT Pub. No.: WO00/57052

PCT Pub. Date: Sep. 28, 2000

(30) Foreign Application Priority Data

Mar. 22, 1999 (DE) .......................... 199 12 741

(51) Int. Cl.$^7$ ................ F02P 5/15; F02P 3/05
(52) U.S. Cl. ............ 123/406.65; 123/406.64; 701/102
(58) Field of Search ........... 123/406.64, 406.65, 123/480, 486; 701/102, 103, 105

(56) References Cited

U.S. PATENT DOCUMENTS

| | | | |
|---|---|---|---|
| 4,133,475 A | 1/1979 | Harned et al. ......... | 123/406.39 |
| 4,794,900 A | 1/1989 | Stuebs et al. .......... | 123/406.55 |
| 4,996,959 A | 3/1991 | Akimoto ................ | 123/406.52 |
| 5,608,388 A | * 3/1997 | Nakajima ............... | 340/825.52 |

FOREIGN PATENT DOCUMENTS

| EP | 0 893 591 | 1/1999 |
|---|---|---|
| JP | 4-114290 | * 4/1992 |

* cited by examiner

*Primary Examiner*—Tony M. Argenbright
(74) *Attorney, Agent, or Firm*—Kenyon & Kenyon

(57) ABSTRACT

An ignition controller has a revolution rate detector, a crankshaft angle detector, a computer, a first read/write memory device for the computed ignition angles for all cylinders, an ignition cycle overlap detector, a FIFO memory for storing a computed ignition angle and a copier for copying the angle from the first memory to the second depending on the degree of overlap. An ignition output device outputs the ignition angle for the next cylinder to be ignited and the corresponding charging time and charging starting angle.

5 Claims, 2 Drawing Sheets

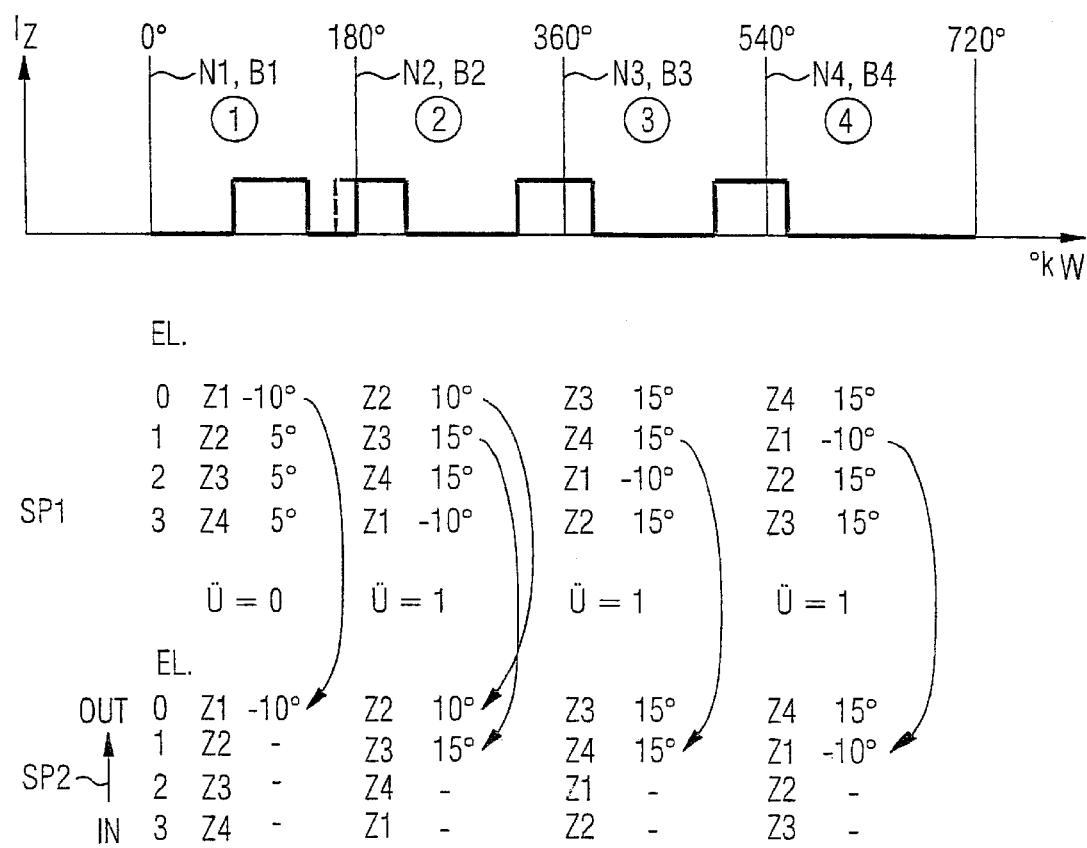

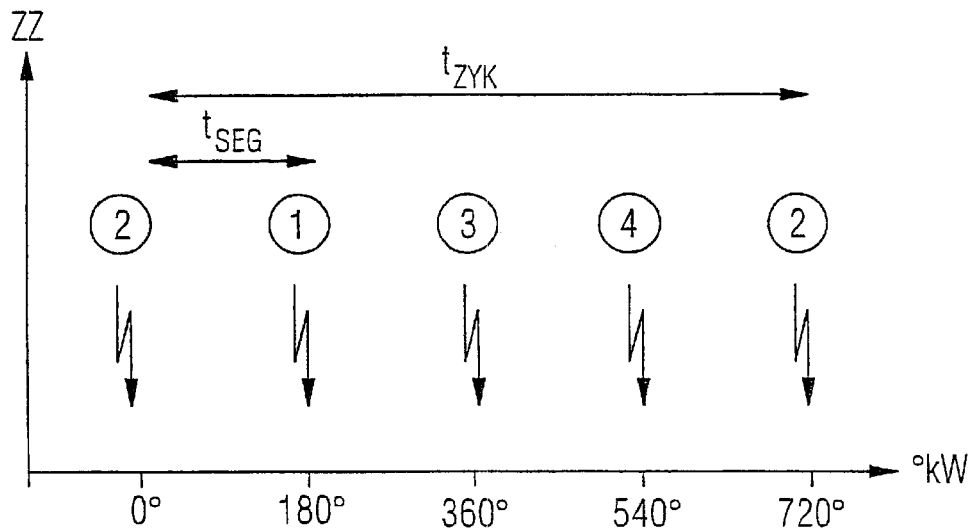
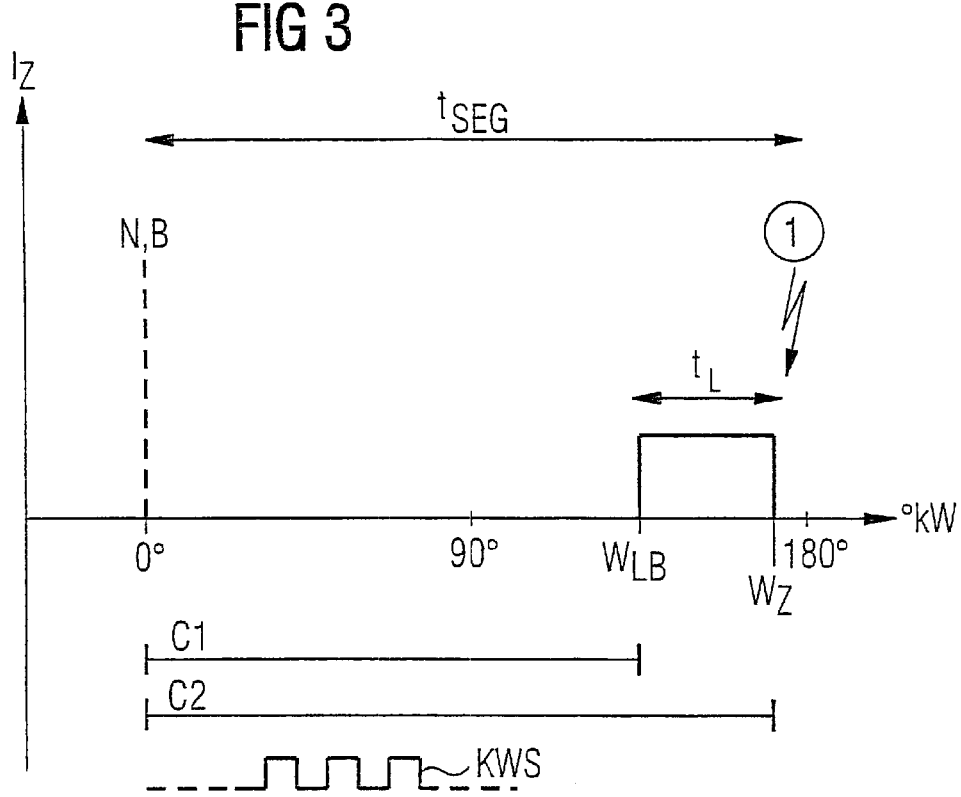

IGNITION CONTROL DEVICE AND METHOD

FIELD OF THE INVENTION

The present invention relates to an ignition control device and a corresponding ignition control method.

Although it can be applied to any ignition control system, the present invention and its underlying principle are explained in relation to an engine control unit on board a motor vehicle.

BACKGROUND INFORMATION

Ignition control devices for controlling ignition events for ignition-coil ignition systems and devices, generally have two control functions: to control a desired ignition power via the ignition coil turn-on time, i.e., charging time, and to control the angle of an ignition pulse via the ignition coil turn-off time, i.e., end of charge.

The ignition power supplied over the ignition coil charging time in coil ignition systems varies in length depending on the vehicle electrical supply voltage applied to the electric circuit of the coil as well as the time constant of the electric circuit.

The respective setpoints are usually stored as a function of engine rpm and other possible engine parameters in the form of a characteristic map in the control unit.

To output angle signals, customary control units have an angle sensor wheel that supplies equidistant-angle pulses to the ignition control device. Most ignition control device architectures, however, allow the ignition events to be calculated only in segments, due to the computation time, with one segment equaling a 720° angle interval of the crankshaft, divided by the number of cylinders, i.e., 180° in a four-cylinder engine, for example. While the angular positions of the ignition events determined in the calculation can therefore be gauged with a sufficient degree of accuracy via the angle sensor wheel and the usual timer and counter circuits in ignition control devices, the calculation itself is based on a detected rpm.

The cylinder-specific control quantities for ignition output are therefore usually calculated once per ignition interval, i.e., segment, and synchronized with ignition output using a cylinder counter. This means that a cylinder counter informs the ignition control device to which cylinder it should send the next ignition signal to be triggered, which includes the start and end of the charge (i.e., ignition).

To calculate the ignition events, the angle/time characteristic for the rotational movement of the internal combustion engine is focused, since the energy in the ignition system is defined over a specific charging time, and the charging time ends at a defined ignition angle position. Thus, we need to know the angle interval to which the charging time corresponds after charging begins. To describe this angular movement, we need to have information about engine rpm.

In most ignition control devices commonly used today for spark ignition engines, this information is determined once per ignition interval at a defined speed measuring point with a fixed angular position in relation to the upper dead center of the next cylinder to be fired. With a longer charging time and/or higher speed, the start of the charging time moves closer to the angular position of the speed measuring point until the speed measuring point finally coincides with the charge interval, and the speed information from the previous segment is used for calculating the ignition event. This is known as overlapping ignition output.

Upon reaching overlap mode, the cylinder counter is corrected by an offset. This means that the ignition events for an ignition interval following the current ignition interval are triggered as early as the current ignition interval. If the ignition output determines, during the current ignition interval, that charging of the current event actually began in the past, the start of charging for the current cylinder is triggered immediately during the current ignition interval, and the start of charging for the subsequent cylinder is triggered with a delay. It is precisely during this transition from non-overlap mode to overlap mode that many ignition output methods lack information about the ignition angle and charging time of the subsequent cylinder, so that the values for the current cylinder are used for the ignition angle and charging time of the subsequent cylinder.

More precise procedures calculate the setpoints of the subsequent cylinders along with the data of the current ignition interval, and buffer this data for the transition to overlap mode. Up to now, however, there has been no clear, transparent system for showing the system user, for example the mechanic, which setpoints are used for ignition output. Furthermore, there is no standard, universally applicable method that could also be used by other output devices.

To explain the underlying principle, FIG. 2 shows a schematic representation of the ignition sequence in a four-cylinder internal combustion engine.

In FIG. 2, crank angle KW is plotted in degrees on the x-axis, ignition ZZ, which has the sequence . . . -2-1-3-4-2- . . . , is plotted on the y-axis. A complete cycle equals 720° KW, with a cycle time $t_{ZYK}$. One segment equals 720°KW/4=180°, with a segment time $t_{SEG}$.

FIG. 3 shows a schematic representation of the ignition control function sequences in the segment for the first cylinder of the four-cylinder internal combustion engine, when applying ignition coil current $I_Z$.

Rotation speed N is detected at 0°, and, immediately afterwards, charging time $t_L$ and ignition angle $W_Z$ (which are more or less equal to the end-of-dwell angle and end-of-charge angle, respectively) are taken from a characteristic map or calculated at calculation time B.

Start-of-dwell or start-of-charge angle $W_{LB}$ is then calculated from the following equation:

$$W_{LB} = W_Z - t_L \times \omega,$$

assuming a uniform movement, where $\omega$ is the angular velocity corresponding to rotation speed N. Due to the computing time, this time and angular position of the ignition events is calculated only once per ignition interval.

To determine the start-of-charge angle, a counter C1 detects angle $W_{LB}$ starting at 0°, via crankshaft sensor signal KWS, and activates the ignition coil output stage upon reaching angle $W_{LB}$. A further counter C2 detects angle $W_Z$ starting at 0° via crankshaft sensor signal KWS, and discontinues activation upon reaching angle $W_Z$.

In the overlap mode mentioned above, it is determined that the event to be triggered by counter C1 lay in the past, and therefore the charge should begin immediately at 0°.

SUMMARY OF THE INVENTION

The ignition control device according to the present invention, and the corresponding ignition control method, have an advantage over known approaches in that they provide a uniform, transparent procedure, which can be used universally on an engine control platform to control the transmission of cylinder-specific control quantities to the ignition output. If desired, the procedure can also be used concomitantly by other output devices, such as the injection output. The transmission of values to the output device can be easily followed.

According to the idea underlying the present invention, the ignition events are managed in two memory blocks.

In a first memory block, which is designed as a simple array, the ignition control device stores the ignition event setpoints for the cylinder that is moving toward its upper ignition dead center during the current segment as well as for all subsequent cylinders.

Based on its internal states, the ignition output process determines the currently active degree of overlap and sets an overlap counter.

A second memory block is organized as a FIFO (first-in first-out) memory (shift register). With each ignition interval, the FIFO elements shift down one element. The overlap counter defines the element in the first memory block to be copied to the top element in the FIFO memory.

Instead of the usual arrangement according to the related art, the ignition output receives the ignition angle not directly from the first memory block of the ignition control device, but from the ignition angle FIFO memory, which can be implemented as separate hardware or as a FIFO area driven by the controller hardware independently of the CPU runtime.

The arrangement has the following special advantages. The transition to a higher degree of overlap takes into account cylinder-specific variations in the ignition angle. The transmission of values is controlled via memory areas and not via temporary buffers. Known application systems usually make memory areas visible, which means that the mechanic can easily follow the event calculation. In particular, this makes it possible to determine that the speed values are no longer up-to-date, which occurs during the transition to overlap mode, as well as the respective tolerances. The on-chip hardware circuits commonly used in microcontrollers make it possible to manage FIFO memories without intervention by the CPU. The method can thus be carried out nearly without change in runtime. The array/FIFO mechanism can also be used by other output methods in which segment overlapping occurs, such as injection output. The ignition angle array and overlap counter can be used to predict overlapping in a subsequent segment, thus avoiding errors during the transition to overlap mode.

According to one preferred embodiment, a prediction device is provided to predict an overlap in the subsequent ignition cycle.

According to a further preferred embodiment, the ignition angle FIFO memory is implemented by software in a read/write memory.

According to a further preferred embodiment, the copy device is implemented by a burst mechanism in a microcontroller.

BRIEF DESCRIPTION OF THE DRAWINGS

FIG. 1 shows a time sequence chart to illustrate one embodiment of the present invention.

FIG. 2 shows a schematic representation of the ignition sequence in a four-cylinder internal combustion engine.

FIG. 3 shows a schematic representation of the ignition control function sequences in the segment of the first cylinder of the four-cylinder internal combustion engine.

DETAIL DESCRIPTION

In the figures, identical reference numbers identify identical elements or elements with the same functions.

FIG. 1 shows a time sequence chart to illustrate one embodiment of the present invention.

In particular, FIG. 1 shows the timing for an ignition sequence for a four-cylinder internal combustion engine, i.e., with four segments of 180° each, in which cylinder 1 undergoes an extreme knock retardation and in which torque builds up through ignition angle advance.

The four-cylinder internal combustion engine is operated by single-spark ignition based on coil ignition. As a result, the charge phase in the embodiment can begin up to three segments before the ignition signal segment, since the ignition system could otherwise drop below a minimum open time (without power supply). The maximum value of overlap counter $\ddot{U}$ is therefore 3, where $\ddot{U}=0$ means no overlap. The two memory devices, ignition angle memory array SP1 and ignition angle FIFO memory SP2, are therefore each 4 elements deep, i.e., elements EL 0, 1, 2, 3.

The ignition control device detects rotation speeds N1, N2, N3, and N4, respectively, at the beginning of each segment, and then calculates, at B1, B2, B3, and B4, respectively, the ignition angles and charging times as well as charge angles for ignition during the current segment, i.e., ignition interval, and for ignition during the next three segments for the subsequent cylinders.

In the past, the first cylinder to move toward the ignition dead center had a strong tendency to knock, and the ignition angle is therefore set to a retarded angle value of −10°. More advanced ignition angles of 5° each, which still occur much later than the optimum ignition angle, are calculated for the three subsequent cylinders. In this case, a torque reduction could be requested in the first segment, for example, by the antijerking function. Because overlap counter $\ddot{U}$ is still set to zero from the previous segment, retarded ignition angle −10° is copied to $0^{th}$ element EL 0 of ignition angle FIFO memory SP2 for the first cylinder. The input address is thus derived from the detected degree of overlap.

The ignition event is transferred from ignition angle FIFO memory SP2 to the output logic of the ignition output in response to a corresponding query, which, in the end, triggers the ignition signals. At the same time, the ignition output receives the charging time from the component controller. The ignition output compares the rotation speed derived from speed detector N1 to the charging time and determines that the start-of-dwell angle for firing the first cylinder still belongs in the first segment. Overlap counter $\ddot{U}$ therefore remains set to zero.

Following output, ignition angle FIFO memory SP2 is shifted down one element (in the OUT direction) at the beginning of the second segment. In the second segment, the ignition events, in turn, are calculated for the current segment and subsequent segments. The setpoint ignition angle for the current cylinder advances abruptly, since torque needs to be built up again, for example, to ensure running smoothness (possibly again via the antijerking function as it attempts to prevent backward oscillation of the engine).

The ignition output evaluates the speed information from second speed detector N2 and the setpoint charging time and determines that the start of charging for the current firing action of the second cylinder actually occurred in the past, i.e., during the first segment. In the present example, the ignition output immediately decides to start charging and to output the ignition angle precisely in the second segment. The ignition output simultaneously detects a simple overlap $\ddot{U}=1$.

When switching to this next higher overlap mode, both elements EL 0 and EL 1 of ignition angle memory array SP1 are be copied to ignition angle FIFO memory SP2. The memory logic (active intervention by the output methods is unnecessary) thus copies $0^{th}$ element EL 0 and first element EL 1 from ignition angle array SP1 to ignition angle FIFO memory SP2, directly calculating, from the latter value, a new start of charging, this time for the subsequent (third) cylinder.

After calling up speed detector N3, ignition angle FIFO memory SP2 is again shifted down one element. Speed detection is always triggered by a separate speed detecting device. Because the overlap counter is now set to value $\ddot{U}=1$, the automatic copy action, which is also triggered by the speed detecting device, causes first element EL 1—15° in this case—of ignition angle array SP1 to be transferred to first element EL 1 of ignition angle FIFO memory SP2, and this element is transmitted to the calculation procedure for the start of charging.

A similar procedure take place at the beginning of the fourth segment, where first element EL 1—10° in this case—of ignition angle array SP2 is transferred to first element EL 1 of ignition angle FIFO memory SP2, and this element is transmitted to the calculation procedure for the start of charging.

Generally speaking, note that, during the transition to a higher overlap mode n, elements EL 0, EL 1, ... EL n—i.e., the intermediate degrees of overlap-are copied once, after which only element EL n is copied within same overlap mode n.

Conversely, during the transition to a lower overlap mode j, only the elements up to corresponding lower element EL j are copied. Thus, if the degree of overlap in the above example changes from $\ddot{U}=1$ to $\ddot{U}=0$ during the transition from the fourth to the first cylinder, only the $0^{th}$ element of ignition angle FIFO memory SP2 is overwritten.

In applying the method described above, the output procedure must therefore includes a calculating device for calculating the start of charging and a calculating device for calculating/outputting the ignition angle. If the output method is implemented exclusively by software, the corresponding calculation paths are clearly separated. The start-of-charge method receives an overlap counter and charging time. The start-of-charge method then accesses the array element addressed by the overlap counter and uses it to check whether the degree of overlap is still valid. If the degree of overlap is too small, the start-of-charge method triggers charging immediately and increment the overlap counter. As a result, the memory logic immediately calls up the start-of-charge calculation again, this time for a subsequent cylinder according to the new overlap counter value.

In one overlap segment, array element EL 1 would thus now be accessed and the output hardware preinitialized accordingly for the subsequent cylinder. However, entering the updated overlap counter into the memory logic not only retriggers the start-of-charge calculation, but also simultaneously copies the first element of ignition angle array SP1 to ignition angle FIFO memory SP2. Automatic memory transfers of this type are possible in most cases, due to the bus controller burst mechanisms present in modem microcontrollers (cf. PEC in the C 167 controller or PTS in the 80C197).

The next time the memory logic calls up the speed detector, ignition angle FIFO memory SP2 is automatically shifted down one element. The ignition angle output always receives its setpoint via $0^{th}$ element EL 0 in the ignition angle FIFO memory, so that the ignition angle calculation does not require any further intelligence. Furthermore, the memory structures can also be implemented by software.

FIG. 1 further shows that the method described enables the transition to the start of dwell in a previous segment to be forecast as early as the previous segment. In this case, the subsequent value in the ignition angle stack is interpreted as early as in the non-overlap mode and used to calculate the start-of-dwell angle.

If the start of dwell for ignition in the subsequent segment does indeed lie in the current segment, the system can immediately switch to overlap mode. If it uses only two interrupts (one start-of-dwell interrupt and one ignition interrupt), widely differing ignition angles and dwell times could cause power to be applied to the subsequent cylinder before power is supplied to the current cylinder. If this is the case, the start of dwell for the subsequent cylinder would have to be calculated on an additional output channel simultaneously with the start of dwell for the current cylinder (which would require a second start-of-dwell interrupt). If an additional trigger unit/interrupt channel is not available, the overlap forecast mode is deactivated in the method described.

In summary, the chronological sequence of the above embodiment is as follows:

Shift FIFO down.

Detect the degree of overlap based on the dwell time, rotation speed, possibly the speed dynamics, ignition angle array, and degree of overlap to that point in time.

Enter the value into the FIFO according to the detected degree of overlap, taking into account a possible change in the degree of overlap.

Read the $0^{th}$ FIFO element to the ignition output.

Although the present invention was described above on the basis of preferred embodiments, it is not limited to these embodiments, but can be modified in many different ways.

In particular, the control mechanism for copying, i.e., outputting, memory can be implemented by hardware or software.

The method can also be applied to any number of cylinders.

What is claimed is:

1. An ignition control device for controlling an ignition coil device for an internal combustion engine, comprising:

a rotation speed detecting device for detecting an rpm of the internal combustion engine at a detection time within an ignition cycle of a first cylinder;

an angle detecting device for detecting a current crank angle of the internal combustion engine;

a calculating device for calculating:
   a specified ignition angle, corresponding to a detected rotation speed, of a next cylinder to be fired, and
   a specified ignition angle, corresponding to the detected rotation speed, of a subsequent cylinder,
   a charging time corresponding to the next cylinder,
   a charging time corresponding to the subsequent cylinder,
   a start-of-charge angle corresponding to the next cylinder, and
   a start-of-charge angle corresponding to the subsequent cylinder,
   wherein the step of calculating is performed at a calculation time within a corresponding one of the ignition cycle of the first cylinder, an ignition cycle of the next cylinder, and an ignition cycle of the subsequent cylinder;

a first memory device including a read/write memory for storing each calculated specified ignition angle;

an overlap detecting device for detecting an overlap of the ignition cycle of the subsequent cylinder, using the ignition cycle of the next cylinder to be fired, and for determining a corresponding degree of overlap;

a second memory device including a FIFO memory for storing the calculated specified ignition angles;

a copying device for copying one of the stored specified ignition angles from the first memory device to the second memory device as a function of the degree of overlap; and an ignition output device for outputting the stored specified ignition angle of the next cylinder to be fired from the second memory device, and for outputting the corresponding charging time and the corresponding start-of-charge angle.

2. The ignition control device according to claim 1, further comprising:

a forecasting device for forecasting the overlap in a subsequent ignition cycle.

3. The ignition control device according to claim 1, wherein:

the FIFO memory is implemented by software in a second read/write memory.

4. The ignition control device according to claim 1, wherein:

the copying device includes a burst mechanism in a microcontroller.

5. An ignition control method for controlling an ignition coil device for an internal combustion engine, comprising the steps of:

detecting a rotation speed of the internal combustion engine at a detection time within an ignition cycle of a first cylinder;

detecting a current crank angle of the internal combustion engine calculating:

a specified ignition angle, corresponding to a detected rotation speed, of a next cylinder to be fired, and a specified ignition angle, corresponding to the detected rotation speed, of a subsequent cylinder, a charging time corresponding to the next cylinder, a charging time corresponding to the subsequent cylinder, a start-of-charge angle corresponding to the next cylinder, and a start-of-charge angle corresponding to the subsequent cylinder, wherein the step of calculating is performed at a calculation time within a corresponding one of the ignition cycle of the first cylinder, an ignition cycle of the next cylinder, and an ignition cycle of the subsequent cylinder;

storing each calculated specified ignition angle for each cylinder in a first memory device including a read/write memory;

detecting an overlap of the ignition cycle of the subsequent cylinder, with the ignition cycle of the next cylinder to be fired, and defining a corresponding degree of overlap;

providing a second memory device including a FIFO memory for storing the calculated specified ignition angles;

copying one of the stored specified ignition angles from the first memory device to the second memory device as a function of the degree of overlap;

outputting the stored specified ignition angle of the next cylinder to be fired from the second memory device; and outputting the corresponding charging time and the corresponding start-of-charge angle.

* * * * *

UNITED STATES PATENT AND TRADEMARK OFFICE
CERTIFICATE OF CORRECTION

PATENT NO.    : 6,374,801 B1
DATED         : April 23, 2002
INVENTOR(S)   : Martin Haussman et al.

It is certified that error appears in the above-identified patent and that said Letters Patent is hereby corrected as shown below:

Column 1,
Line 51, change "focused" to -- forecast --

Column 2,
Line 63, change "invention," to -- invention

Column 3,
Line 65, change "DETAIL" to -- DETAILED --

Signed and Sealed this

Fourth Day of November, 2003

JAMES E. ROGAN
*Director of the United States Patent and Trademark Office*